(12) United States Patent
Amadardo

(10) Patent No.: US 10,724,267 B2
(45) Date of Patent: Jul. 28, 2020

(54) STRUCTURE WITH HOLLOW OR PARTIALLY HOLLOW STRUCTURAL ELEMENTS, WITH MODULAR AND IMPROVED SYSTEM OF JOINTS

(71) Applicant: ESDRA SRL UNIPERSONALE, Jesolo (IT)

(72) Inventor: Gianfranco Amadardo, Jesolo (IT)

( * ) Notice: Subject to any disclaimer, the term of this patent is extended or adjusted under 35 U.S.C. 154(b) by 0 days.

(21) Appl. No.: 16/086,371

(22) PCT Filed: Feb. 20, 2017

(86) PCT No.: PCT/IB2017/050951
§ 371 (c)(1),
(2) Date: Sep. 19, 2018

(87) PCT Pub. No.: WO2017/145039
PCT Pub. Date: Aug. 31, 2017

(65) Prior Publication Data
US 2019/0100937 A1    Apr. 4, 2019

(30) Foreign Application Priority Data

Feb. 23, 2016   (IT) .................. 102016000018213

(51) Int. Cl.
| | |
|---|---|
| *E04H 15/34* | (2006.01) |
| *E04F 10/00* | (2006.01) |
| *E04B 1/58* | (2006.01) |
| *F16B 7/18* | (2006.01) |
| *F16B 12/50* | (2006.01) |

(Continued)

(52) U.S. Cl.
CPC ......... *E04H 15/34* (2013.01); *A47B 47/0016* (2013.01); *E04B 1/5831* (2013.01); *E04F 10/00* (2013.01); *F16B 7/185* (2013.01); *F16B 12/50* (2013.01); *E04B 2001/5856* (2013.01); *F16B 2012/446* (2013.01)

(58) Field of Classification Search
CPC ......... E04H 15/32; E04H 15/34; E04H 15/44;
E04H 1/58; E04B 1/1903; E04B 1/19;
E04B 1/38; E04B 1/5831; F16B 7/00;
F16B 7/185; F16B 12/50; F16B 12/44;
F16B 2012/446; F16B 7/18; Y10T 403/44
USPC ... 135/121–122, 87, 120.1, 120.3, 157, 909;
52/63, 86, 222, 646, 655.1, 656.9, 273;
403/170–172, 217–219, 374.3–374.4, 371
See application file for complete search history.

(56) References Cited

U.S. PATENT DOCUMENTS

| | | | | |
|---|---|---|---|---|
| 2,956,705 A | * | 10/1960 | Clingman | .......... A47B 47/0008 220/683 |
| 3,661,434 A | * | 5/1972 | Alster | .................. A47B 47/005 312/111 |

(Continued)

FOREIGN PATENT DOCUMENTS

| | | |
|---|---|---|
| DE | 2709421 | 9/1977 |
| WO | 2007082962 | 7/2007 |

*Primary Examiner* — David R Dunn
(74) *Attorney, Agent, or Firm* — Themis Law

(57) ABSTRACT

A structure with hollow or partially hollow structural elements for shade structures, such as gazebos, sunshades, beach umbrellas or covering structures in general, or adapted to be used for furniture, includes a plurality of hollow or partially hollow structural elements and a system of joints configured to join the structural elements to one another.

13 Claims, 8 Drawing Sheets

(51) Int. Cl.
*A47B 47/00* (2006.01)
*F16B 12/44* (2006.01)

(56) References Cited

U.S. PATENT DOCUMENTS

| | | | | |
|---|---|---|---|---|
| 3,772,837 | A * | 11/1973 | Hunt | E04B 2/766 |
| | | | | 52/127.12 |
| 4,034,535 | A * | 7/1977 | Dustmann | E04F 13/0814 |
| | | | | 52/834 |
| 5,224,307 | A | 7/1993 | Lukos | |
| 5,655,348 | A * | 8/1997 | Paradise | E06B 3/9642 |
| | | | | 403/231 |
| 6,192,643 | B1 * | 2/2001 | Zadok | E04B 1/0046 |
| | | | | 52/204.1 |
| 6,332,657 | B1 * | 12/2001 | Fischer | A47B 47/0008 |
| | | | | 312/111 |
| 6,338,226 | B1 * | 1/2002 | Gauthier | A01G 9/14 |
| | | | | 52/63 |
| 7,845,139 | B1 * | 12/2010 | Mansueto | E06B 3/9642 |
| | | | | 29/525.01 |
| 8,192,105 | B2 * | 6/2012 | Keyvanloo | A47B 47/0016 |
| | | | | 403/171 |
| 2011/0194892 | A1 | 8/2011 | Huang | |
| 2015/0377414 | A1 * | 12/2015 | Pirseyedi | A47B 47/0016 |
| | | | | 403/205 |
| 2017/0145679 | A1 * | 5/2017 | Upfal | E04B 1/2403 |
| 2019/0024362 | A1 * | 1/2019 | Pfeiffer | A47B 47/02 |

* cited by examiner

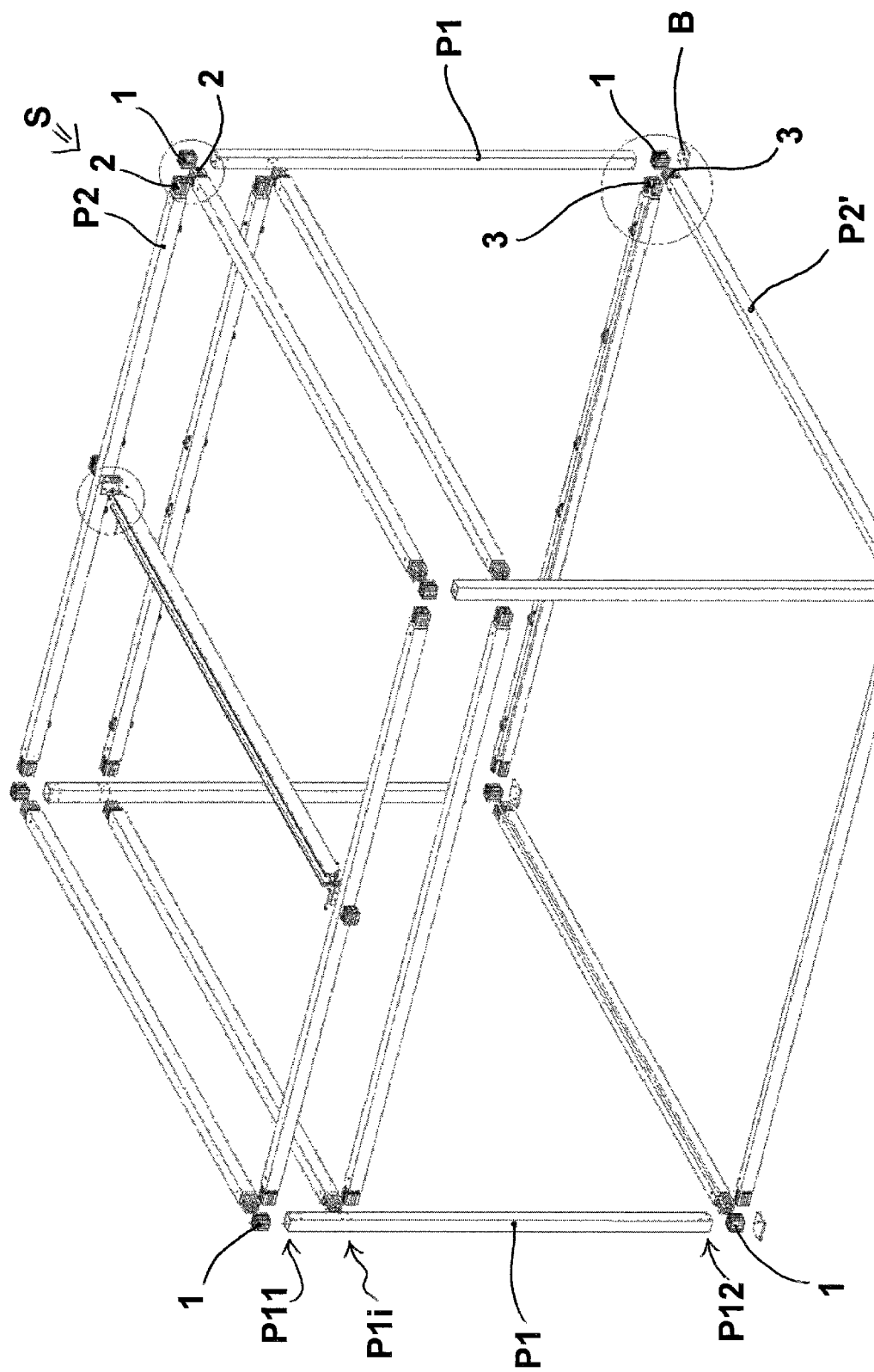

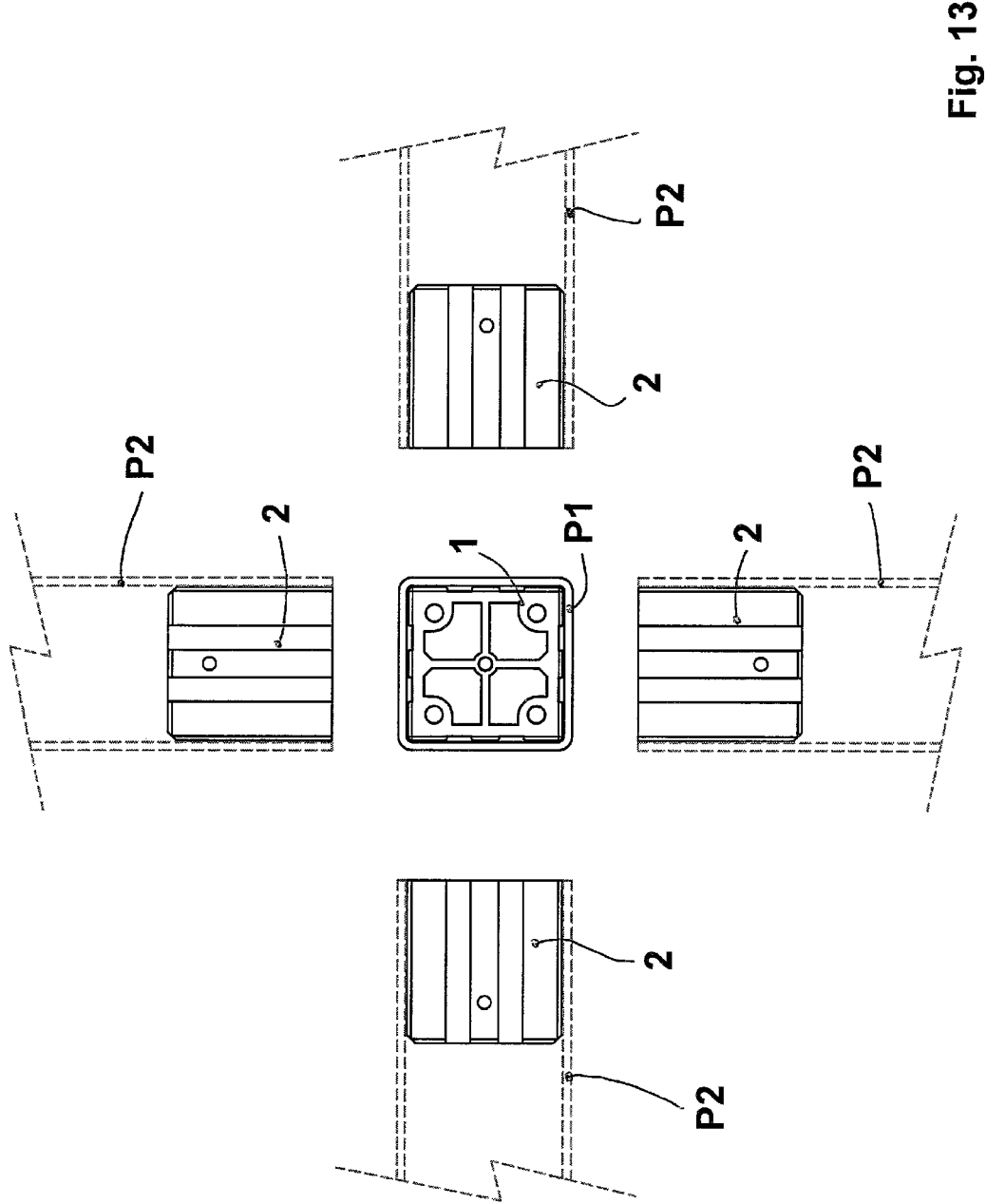

STRUCTURE WITH HOLLOW OR PARTIALLY HOLLOW STRUCTURAL ELEMENTS, WITH MODULAR AND IMPROVED SYSTEM OF JOINTS

The present invention concerns shade structures, such as gazebos, sunshades, beach umbrellas and covering structures in general, and the furniture sector, in particular the outdoor furniture sector, and in particular it concerns a new structure with hollow or partially hollow structural elements, for example a shade structure or a covering structure or a structure suited to be used for furniture in general, provided with a modular and improved system of joints.

Shade structures or outdoor structures in general are known, such as gazebos, porticoes in Pompeian style, pergolas, etc. Said shade structures can be made in different manners, using different materials.

For example, structures made with wooden beams are known and widely used, wherein said wooden beams are rigidly connected to one another through fixing means, and wherein one or more covering sheets or panels are in turn constrained to said beams in a removable or non removable manner.

Light shade structures are also known, which are made with hollow or partially hollow tubular elements or structural elements, for example made of aluminium. Said structural elements are generally provided with holes made in their sides and suited to allow the insertion of fixing means for fixing them to the other structural elements making up the structure, said fixing means being, for example, screws and brackets.

A drawback of light shade structures, meaning the structures made using hollow or partially hollow structural elements, lies in that these cannot be removed and reassembled for an indefinite number of times, since the type of fixing system described above tends to wear out easily.

Furthermore these structures, if made of metal, generally have a limited duration, as not all of their parts can undergo anodizing and painting treatments intended to make them resistant to outdoor conditions.

In addition to the above, the type of fixing system described above is characterized by limited resistance, as the fixing means are applied only through the solid portion of the sides of the structural element.

Angle connectors are currently used to make structures with hollow structural elements, for example gazebos, sunshades, beach umbrellas or covering structures in general, said angle connectors comprising, for example, a centre body intended to remain visible, a vertical male projection suited to be inserted in the top of the structural element forming a column of the structure, and two or more further male projections, orthogonal with respect to said vertical male projection and suited to be inserted into a corresponding number of structural elements forming the lintels of the structure.

Connection elements made of steel are also known, which are laser cut and bent so that they can be inserted in the hollow structural elements for connection to other structural elements.

A drawback posed by this type of connection elements lies in that, in the case where two structural elements need to be fixed using screws, the thickness of the structural element and of the connection element is not sufficient for the stable anchorage of the screws and therefore threaded bushes must be added in which the screws can be tightened, thus further complicating the structure assembly procedures.

A further drawback lies in that the hollow structural elements used with this type of connection elements, furthermore, need to be specially shaped with grooves and inner seats suited to house said connection elements.

The assembly procedures, furthermore, are very complex, as in the known structures several types of connection elements are generally used, whose correct installation requires also good manual skills and expertise, as well as a large number of specific tools. In order to overcome the drawbacks described above, a new structure with hollow or partially hollow structural elements has been designed and manufactured, for example a shade or covering structure or a structure for furniture in general, provided with a modular and improved system of joints.

It is the main object of the present invention to provide a structure that can be assembled quickly, while at the same time ensuring its stability.

It is another object of the present invention to provide a structure with hollow or partially hollow structural elements, particularly suited to be used for shading or covering purposes or for furniture in general, while at the same time ensuring maximum modularity and versatility.

It is another object of the present invention to provide a structure with hollow or partially hollow structural elements whose joints are not visible.

An advantage of the present invention is represented by the fact that it is possible to use hollow structural elements with simple cross section, meaning with no need to use special shapes, thus reducing the overall production costs.

It is another object of the present invention to provide a structure with simplified assembly procedures.

An important advantage of the present invention is represented by the fact that it is possible to pre-assemble some parts of the new structure, in order to make it even simpler and easier to complete the assembly procedure, even and especially for inexpert installers.

Another advantage lies in that the overall dimensions of the disassembled or partially assembled parts can be reduced, with consequent advantages during the storage, packaging and transport steps.

Another advantage is represented by the fact that no specific and specialist tools are required for the assembly of the new structure.

These and other direct and complementary objects are achieved by the new structure with hollow or partially hollow structural elements, for example a shade or covering structure or a structure for furniture in general, provided with a modular and improved system of joints.

The new structure comprises a plurality of hollow or partially hollow structural elements, and a system of joints suited to connect said structural elements to one another, wherein said joints are in a substantially prismatic shape and are suited to be axially inserted in said structural elements.

Said joints, for example, have substantially square or rectangular cross section, or in any case their cross section matches that of said structural elements, and is slightly smaller than the cross section of said structural elements, in order to allow the precise insertion of each joint in the corresponding structural element.

Each one of said joints in turn comprises two opposite end sides, a front one and a rear one, intended to be positioned orthogonally with respect to the direction of development of the structural element in which the joint is inserted, and lateral sides suited to be positioned opposite and parallel to the sides of the structural element in which said joint is fitted.

In the most frequent case, that is, when the joint has square or rectangular cross section matching the cross section of the structural element, said lateral sides are four, parallel to and facing each other in pairs.

The longitudinal direction of the joint is considered to be the orthogonal direction with respect to said end sides, wherein said longitudinal direction defines also the direction according to which the joint is fitted in the structural element.

The transverse direction of the joint is considered to be any direction lying on a plane that is orthogonal to said longitudinal direction.

Each one of said joints may be provided with one or more through holes made according to said longitudinal direction and/or one or more through or blind holes made according to one or more transverse directions, said holes being suitable for the insertion of means for fixing said joints together and to said structural elements in which they are fitted, thus joining the structural elements themselves.

Said system of joints comprises one or more different types of joints.

In particular, said system comprises at least one joint, hereinafter referred to as terminal joint, which is holed in said longitudinal direction, meaning that it comprises one or more through longitudinal holes between said end sides, wherein said terminal joint is suited to be inserted longitudinally at the level of the end of one of said structural elements, in such a way that one of said end sides of the terminal joint is substantially aligned with one end of the structural element itself, or slightly projecting from it or slightly recessed into it.

Said terminal joint preferably comprises also at least one hole or seat made in at least one of its lateral sides, for the insertion of a pin or screw intended to constrain said terminal joint to the structural element.

Said system of joints preferably comprises also at least one further joint, hereinafter referred to as internal joint, comprising, as an alternative to or in combination with said one or more holes made in the longitudinal direction, also one or more holes made in its lateral sides and oriented crosswise, meaning orthogonally with respect to the respective lateral side in which said holes are made.

Said internal joints are suited to be fitted in said hollow structural elements in any position, meaning in proximity to one end of the structural element, or in any position along the length of the structural element.

At least said holes made crosswise, and possibly even said holes made in the longitudinal direction, are threaded internally and their length is sufficient to allow them to be coupled with a correspondingly threaded screw or fixing means in a stable manner.

In order to join a first structural element to a second structural element, it is necessary to insert a first joint of the internal type at the level of the end or in another position in said first structural element, and a second joint of the terminal type at the level of the end of said second structural element. Then, it is necessary to mutually position said structural elements in such a way that the end side of said terminal joint of said second structural element is positioned at the level of a lateral side of said internal joint of said first structural element, so that said longitudinal holes made in said terminal joint are substantially aligned and coinciding with said transverse holes made in said internal joint, with the lateral side of said first structural element interposed therebetween.

In the sides of said first structural element there are through holes at the level of said transverse holes of said internal joint inserted therein, said through holes being suited to allow the insertion of the fixing screws.

It is therefore possible to join the two structural elements by means of one or more screws inserted in the corresponding longitudinal holes of said terminal joint of the second structural element and in the holes made in the lateral side of said first structural element, said screws being screwed also in the corresponding transverse holes made in the internal joint of the first structural element.

Said second structural element will thus be constrained orthogonally to a lateral side of the first structural element.

Thanks to the special configuration of the new system of joints, it is possible for a single internal joint to be connected to as many terminal joints as are the sides of the internal joint itself.

For example, considering an internal joint in a prismatic shape with square cross section, said internal joint, together with the structural element in which it is fitted, can be connected to maximum four terminal joints inserted in the same number of structural elements at the same time.

Therefore, with the same joint it is possible to make connections in as many transverse directions as are the lateral sides of the joint itself.

Said joints can be internally solid, except for the presence of said longitudinal and/or transverse holes.

Said joints can also be hollow, with sufficiently thick lateral sides, for example and preferably at the level of the corners, so that the length of said transverse holes is sufficient to guarantee the anchorage of the screws.

In proximity to said corners, preferably there are also longitudinal thicker sections in which said longitudinal holes are made.

Said longitudinal holes can be as long as said joint, or they can be shorter, and in particular they are obtained in proximity to said front end side, thus allowing the insertion of the screw in such a way that the head of the screw is substantially contained in the joint, while the shank projects from said front end side.

According to the invention, in the case of hollow joints, the inside of said joints may be provided with one or more ribs, for example comprising one or more partitions or walls with longitudinal development, arranged orthogonally with respect to the end sides.

According to the invention, said transverse ribs are, for example, at least one pair of partitions arranged so as to form a cross and defining at least one centre core arranged longitudinally and preferably holed axially in such a way as to define at least one substantially central longitudinal hole.

Said central longitudinal hole, for example, can be conveniently used for inserting and fixing rods and/or poles, for example for antennas, signs, flags, etc., with said terminal or internal joint placed at the level of the end of a structural element serving as a column.

Said central longitudinal hole can be conveniently used also for inserting and fixing means for anchoring the joint to the base, with said terminal or internal joint fitted in the base of a structural element that can be used as a column.

Said ribs can be stiffening ribs. However, according to the invention said joints, for example if they are solid or have rectangular cross section, can be without said ribs.

According to the invention, said system of joints may comprise, as an alternative to or in combination with the terminal and internal joints described above, one or more joints in which the characteristics of the latter are combined.

In particular, said combined joint comprises said longitudinal holes and also said transverse holes, in such a way that it can be used as a terminal joint, using said longitudinal holes to accommodate fixing screws, or as an internal joint, using said transverse holes to screw and anchor said fixing screws.

The new system preferably comprises also one or more joints provided with a longitudinal groove, so that said joint/joints has/have shaped cross section with at least one recess at the level of a corner, wherein said joint/joints is/are suited to be inserted in a correspondingly shaped structural element intended to be used as a perimeter horizontal structural element and positioned at the level of the edges of a floor.

According to the invention, the new joint may also comprise one or more joints provided with at least two longitudinal grooves, in such a way that the cross section has two recesses, for example two specular recesses in two adjacent corners, and may be suited to be inserted in a correspondingly shaped structural element, so that it can be used as a horizontal structural element between two floors.

In the preferred solution, said joints are made of a metallic material, for example, they can be conveniently made of aluminium or other alloys and be obtained through an extrusion process, wherein said longitudinal direction coincides with said direction of extrusion.

Said joints are thus obtained by cutting an extruded structural element to size, wherein the longitudinal holes are obtained during the extrusion process while the transverse holes are obtained through successive mechanical machining operations.

According to the invention, said joints can be obtained using other technologies, for example through a die casting process.

According to the invention, it is also possible to use other materials to make said joints, such as, for example, composite or synthetic or plastic materials, wherein the production process includes the forming of threaded bushings and not necessarily but conveniently the insertion of the latter in the screw fixing holes.

Also said hollow or partially hollow structural elements are conveniently made of a metallic material, for example aluminium or other alloys, or of other types of material, such as plastic or synthetic materials and so on.

According to the invention, one or more of said joints can also be pre-assembled on at least one structural element, for example one or more terminal joints can be positioned outside said structural element and constrained to one or more corresponding internal joints fitted in the structural element itself.

The characteristics of the new structure are highlighted in greater detail in the following description, with reference to the attached drawings, which are enclosed hereto by way of non-limiting examples.

FIG. 10 shows an exploded view of a possible embodiment of the new structure (S) with hollow or partially hollow structural elements (P1, P2, P2') joined together by means of joints (1, 2, 3), as described and claimed here below.

Figure 11:
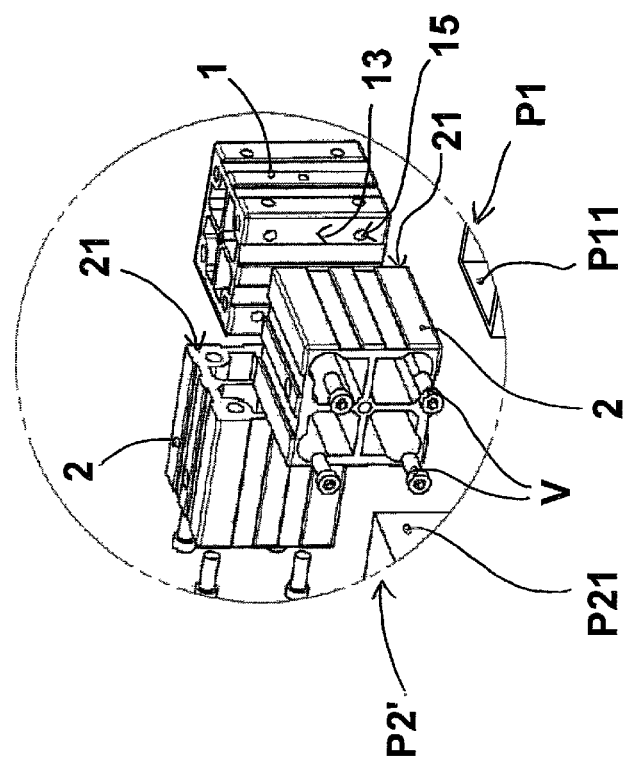

FIG. 11 shows an exploded view of a detail of the connection area between the top (P11) of a structural element serving as a column (P1), that is, forming the column of the structure (S), and the ends (P21) of two structural elements (P2) serving as lintels, that is, constituting the lintels of the structure (S), wherein said connection is obtained by means of an internal joint (1) suited to be fitted in said top (P11) of said structural element (P1) serving as a column and of two terminal joints (2) suited to be fitted in said ends (P21) of said structural elements (P2) serving as lintels.

Figure 12:
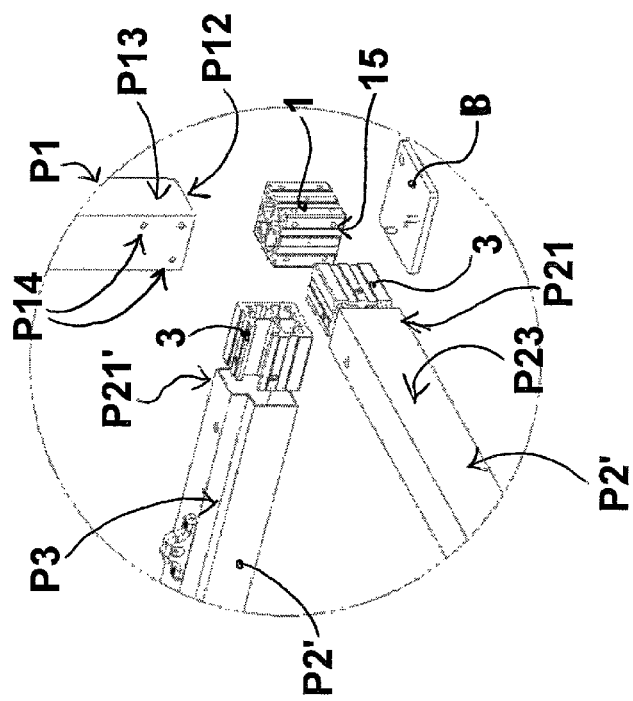

FIG. 12 shows an exploded view of a detail of the connection area between the base (P12) of a structural element (P1) serving as a column, the ends (P21') of two perimeter structural elements (P2'), meaning elements forming the base perimeter of the structure (S), and a base element (B), wherein said connection is obtained by means of an internal joint (1) suited to be inserted in said base (P12) of said structural element (P1) forming the column and of two terminal joints (3) provided with a recess (31) and suited to be inserted in said ends (P21') of said perimeter structural elements (P2').

FIG. 13 shows how a single internal joint (1) can be connected to four terminal joints (2) in the four directions orthogonal to the four lateral sides (13) of the internal joint (1) itself. The invention is a structure (S) with hollow or partially hollow structural elements (P1, P2, P2'), for example a shade or covering structure or a structure for furniture in general, provided with a modular and improved system of joints for connecting said structural elements to one another.

Said structure (S) comprises, for example, a plurality of structural elements (P1, P2, P2') with substantially square or rectangular cross section or in any case simple cross section, suited to serve as the columns and lintels or other parts of the structure (S).

Said structure (S) may also comprise structural elements (P2') in a different shape, for example provided with a longitudinal recess or cavity (P3) at the level of a corner, and wherein said structural elements (P2'), for example, are suited to form the base perimeter of the structure (S), which comes into contact with the perimeter of the floor.

Said joints (1, 2, 1', 2', 3, 4, 5, 6) have a substantially prismatic shape and are suited to be axially inserted in said structural elements (P1, P2, P2'). Therefore, the shape of the cross section of said joints (1, 2, 1', 2', 3, 4, 5, 6) substantially matches the shape of the cross section of said structural elements (P1, P2, P2'), while the size of the cross section of said joints (1, 2, 1', 2', 3, 4, 5, 6) is slightly smaller than that of the cross section of said structural elements (P1, P2, P2'), so as to allow the precise insertion of each joint in the corresponding structural element.

Each one of said joints (1, 2, 1', 2', 3, 4, 5, 6) in turn comprises two opposite end sides, a front one (11, 21) and a rear one (12, 22) with respect to the longitudinal direction (X) of insertion in the corresponding structural element.

Said front end side (11, 21) is, in particular, the one intended to be facing towards the outside of the structural element, while said rear end wall (12, 22) is the one intended to be facing towards the inside of the structural element.

Each one of said joints (1, 2, 1', 2', 3, 4, 5, 6) in turn comprises also lateral sides (13, 23) suited to be positioned opposite and parallel to the sides of the structural element in which said joint is inserted.

Figure 4:
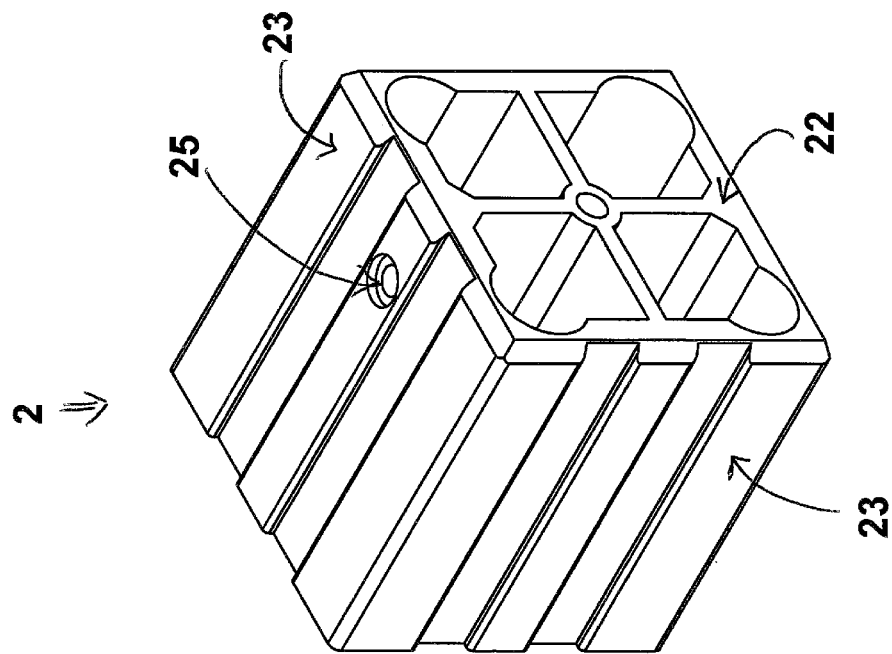
FIGS. 3 and 4 show two views of a joint (2) of the terminal type.
Figure 3:
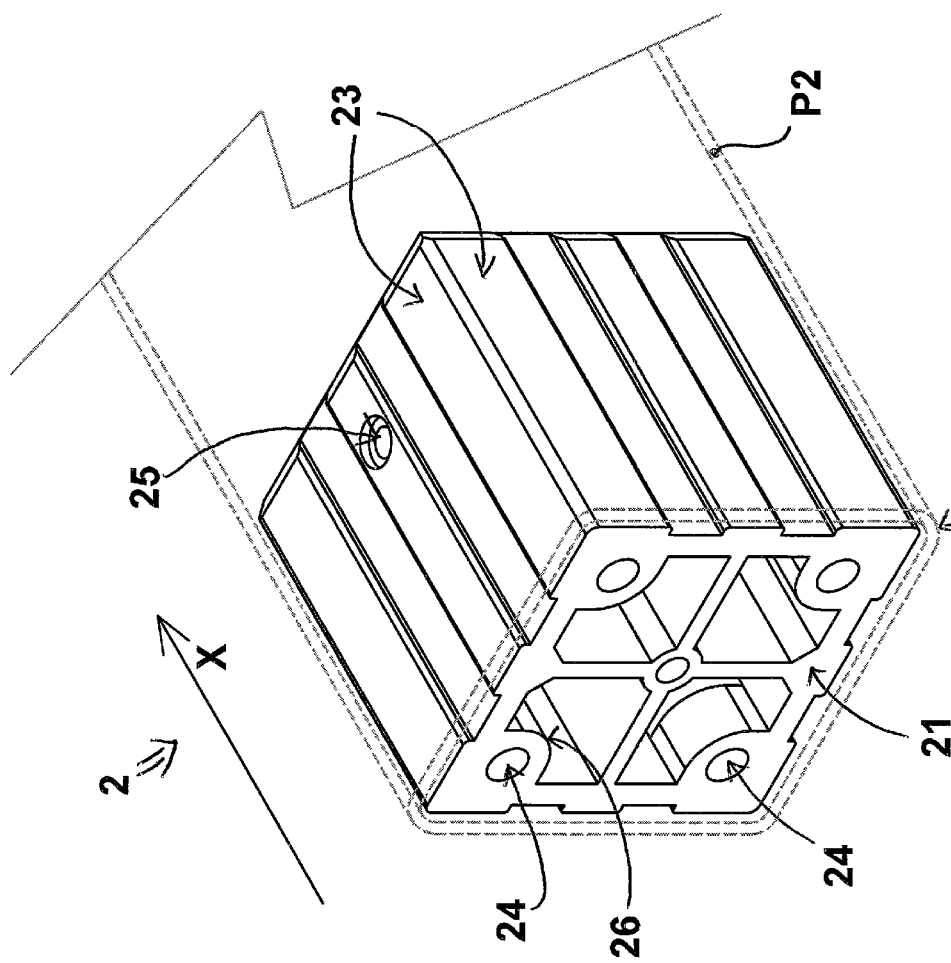
Figure 5:
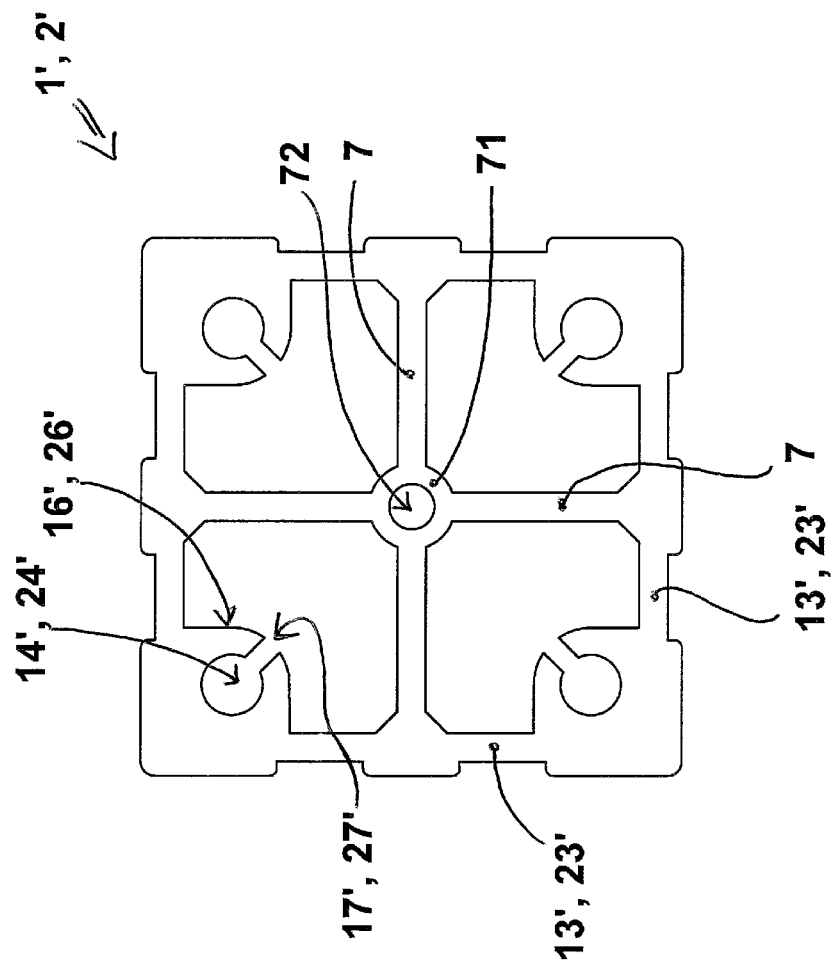
FIG. 5 shows a sectional view of a joint, for example of the terminal type (2') or of the internal type (1') according to an alternative solution, wherein the longitudinal holes (14', 24') are partially open (17', 27').

Said system of joints comprises a first type of joint, or terminal joint (2), represented in FIGS. 3 and 4 and suited to be inserted longitudinally in the end (P21) of one of said structural elements (P2), so that said front end side (21) of said terminal joint (2) is substantially aligned with said end (P12) of the structural element (P2) itself.

Said terminal joint (2) is holed in said longitudinal direction (X), that is, it is provided with one or more holes (24) between said end sides (21, 22) and also with at least one hole or seat (25) made in at least one of its lateral sides (23) for the insertion of a pin or screw suited to constrain said terminal joint (2) to the respective structural element (P2).

Figure 2:
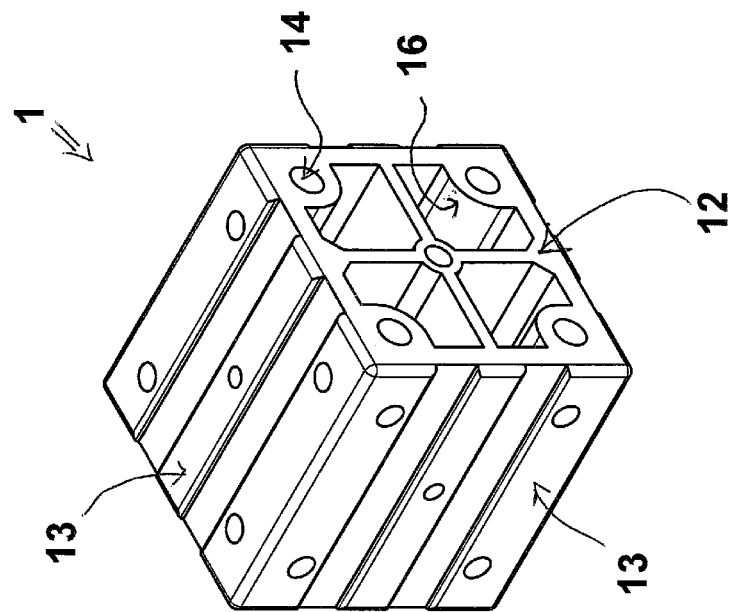
FIGS. 1 and 2 show two views of a joint (1) of the internal type.
Figure 1:
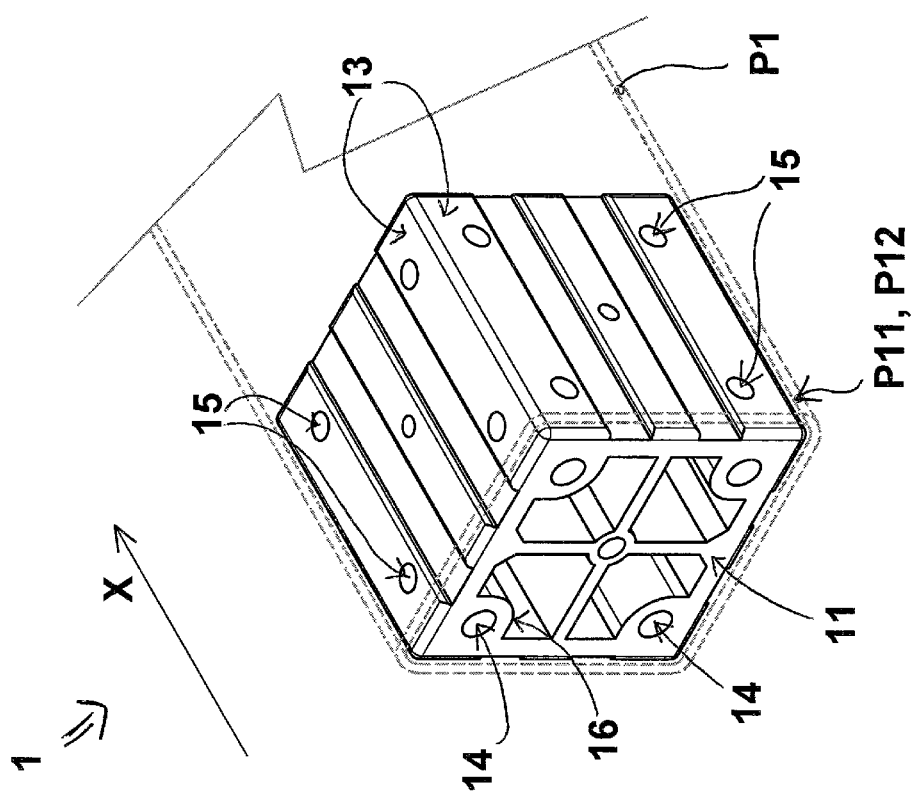

Said system of joints comprises also a second type of joint, or internal joint (1), as can be seen in FIGS. 1 and 2, suited to be fitted in one of said structural elements (P1) in any position, meaning in proximity to one end (P11, P12) of the structural element (P1) or in any position (Pli) along the length of the structural element (P1).

Said internal joint (1) is preferably provided with one or more longitudinal holes (11) and also with one or more transverse holes (15) in its lateral sides (13), and preferably in all of said lateral sides (13).

FIGS. 10 and 11 schematically show how one or more structural elements can be joined together by means of said new system of joints.

In the example, one of said structural elements (P1) with square cross section, or column element, is positioned vertically so as to form a column of the structure (S) and is joined to two further structural elements (P2) with square cross section, or lintel elements, which are arranged orthogonally to said first structural element (P1) and form two lintels of the structure (S).

A terminal joint (2) is inserted in the end (P21) of said lintel elements (P2), while an internal joint (1) is inserted in the top (P11) of said column element (P1).

Said structural elements to be joined (P1, P2, P2) are mutually positioned in such a way that the front end side (21) of a terminal joint (2) of a lintel element (P2) is positioned at the level of a lateral side (13) of said internal joint (1), so that said longitudinal holes (24) made in said terminal joint (2) are substantially aligned and coincide with said transverse holes (15) made in said internal joint (1), with the lateral side (P13) of said column element (P1) interposed therebetween.

In the sides (P13) of said column element (P1) there are through holes (P14) at the level of said transverse holes (15) made in said internal joint (1), wherein said through holes (P14) are suited to allow the insertion of the fixing screws (V).

It is therefore possible to join two structural elements (P1, P2) by means of one or more screws (V) inserted in the corresponding longitudinal holes (24) made in said terminal joint (2) and in the holes (P14) made in the lateral side (P13) of said column element (P1), said screws (V) being screwed also in the corresponding transverse holes (15) made in the internal joint (1) of said column element (P).

An internal joint (1), with the corresponding structural element (P1) in which it is fitted, can be constrained to a maximum number of terminal joints (2), and the respective structural elements (P2), equal to the number of the lateral sides (13) of said internal joint (1) itself.

Using the same internal joint (1) it is possible to make connections in several directions, and in particular in all the transverse directions which are orthogonal to said lateral sides (13).

Said longitudinal holes (14, 24) are preferably made in proximity to the corners (16, 26) of the corresponding joint (1, 2), which are conveniently at least partially thicker.

The length of said longitudinal holes (14, 24) can be substantially equal to the length of the respective joint (1), or shorter than that, as in the example represented in FIGS. 3 and 4, in which said longitudinal holes (24) of the terminal joint (2) cover only part of the length and are made in proximity to said front end side (21).

Said joints (1, 2, 1', 2', 3, 4, 5, 6) may also comprise at least one further longitudinal inner hole (72), for example substantially central, which can be conveniently used to fix rods/poles, for example for antennas, signs, flags, etc., wherein said terminal joint (2) or internal joint (1) is placed at the top (P11) of a column element (P1).

Said longitudinal centre hole (72) can also be conveniently used at the base (P12) of a column element (P1) for the insertion of means for anchoring the structural element to the base.

Said longitudinal centre hole (72), for example, is obtained in a longitudinal centre core created inside the joint (1, 2, 1', 2', 3, 4, 5, 6) by means of one or more ribs (7), meaning partitions or walls with longitudinal development, for example arranged orthogonally to the lateral sides (13, 23, 13', 23') of the joints (1, 2, 1', 2', 3, 4, 5, 6).

Figure 6:
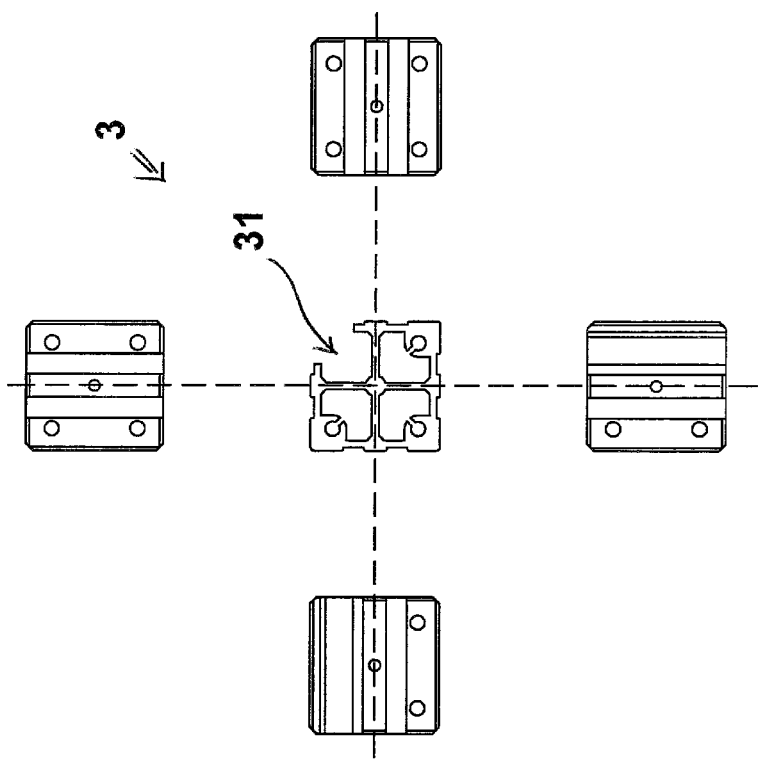
FIG. 6 shows five views of a joint (3) provided with a longitudinal recess (31) and suited to be inserted in horizontal perimeter structural elements (P2') of a floor.
Figure 9:
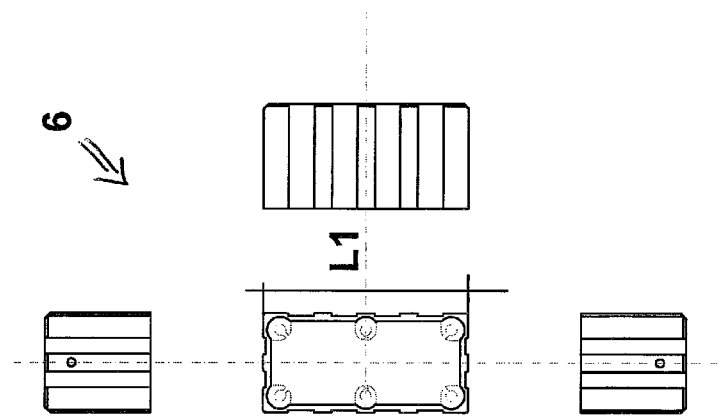
FIG. 9 shows five views of a joint (6) of the terminal type with rectangular cross section, suited to be inserted in the end of structural elements with matching cross section.
Figure 8:
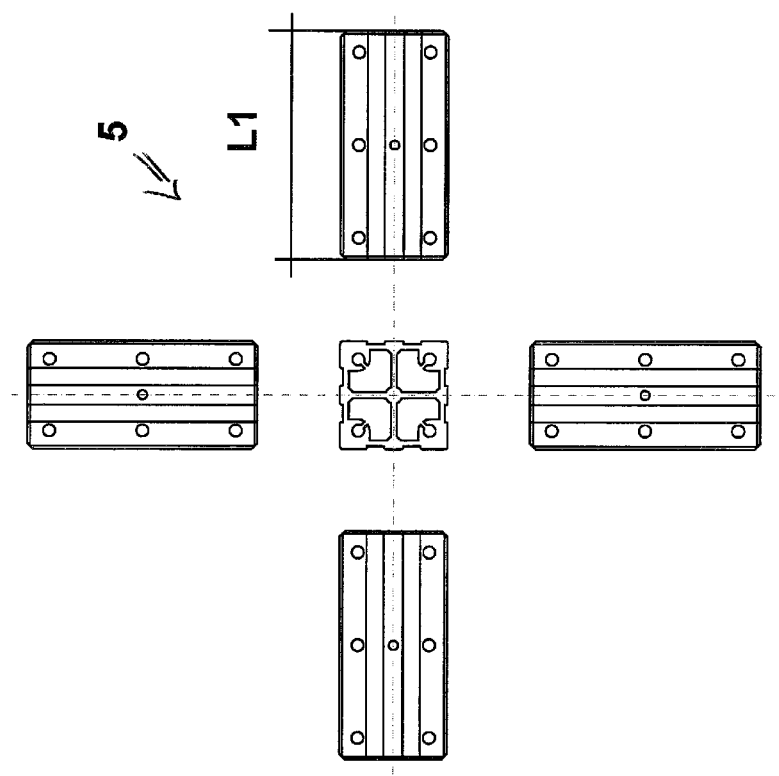
FIG. 8 shows five views of a joint (5) of the internal type with square cross section but with increased length (L1), suited to be coupled with joints (6) of the terminal type with rectangular cross section.

In the example shown in FIG. 6, the joint (3) is provided with a longitudinal groove (31), being suited to be inserted in a correspondingly shaped structural element (P2') intended to be used as a horizontal perimeter structural element and positioned at the level of the edges of a floor.

Figure 7:
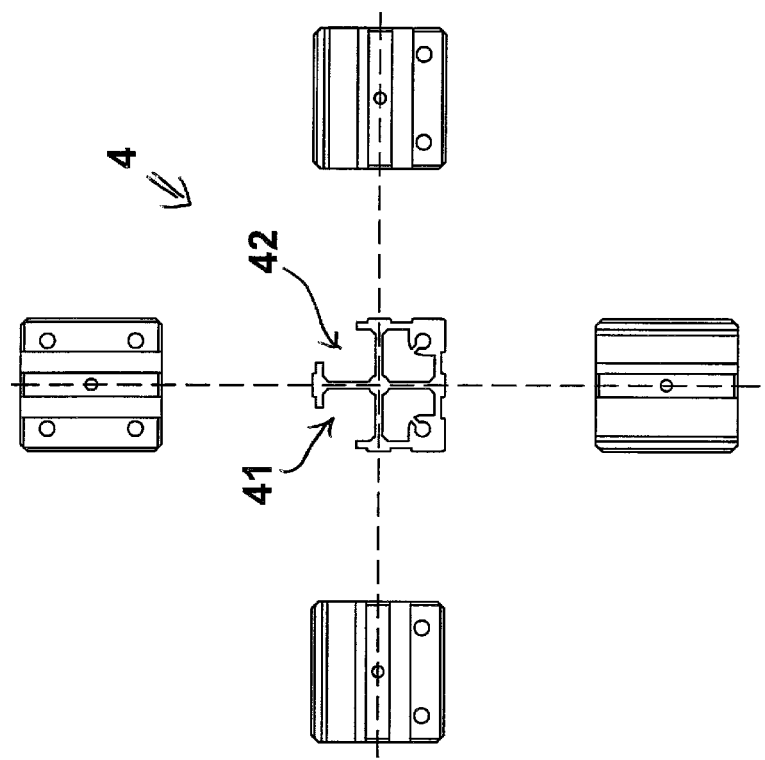
FIG. 7 shows five views of a joint (4) provided with two longitudinal recesses (41, 42) and suited to be inserted in horizontal intermediate structural elements of a floor.

In the example shown in FIG. 7, the joint (4) is provided with at least two longitudinal grooves (41, 42), being suited to be inserted in a correspondingly shaped structural element so that it can be used as a horizontal structural element between two floors.

The system may also comprise one or more joints (6) of the terminal type and with rectangular cross section, suited to be fitted in structural elements having matching cross section and coupled with corresponding joints (5) of the internal type which have increased length (L1) corresponding to the long side of said joints (6) with rectangular cross section.

These are the schematic outlines which are sufficient for the expert in the art to implement the invention, consequently, during the actual construction process variants may be developed that do not affect the innovative substance of the invention described herein.

Therefore, with reference to the above description and the attached drawings, the following claims are expressed.

The invention claimed is:

1. A structure (S) with hollow or partially hollow structural elements (P1, P2, P2'), for shading or covering structures or adapted to be used for furniture, comprising:
   a plurality of said hollow or partially hollow structural elements (P1, P2, P2'); and
   a system of joints (1, 2, 1', 2', 3, 4, 5, 6) configured to join said structural elements (P1, P2, P2') to one another,
   wherein each one of said joints (1, 2, 1', 2', 3, 4, 5, 6):
   is configured to be axially fitted in said structural elements (P1, P2, P2'), and is essentially prismatic in shape, with a cross section having an outer shape essentially matching an inner shape of a cross section of said structural elements (P1, P2, P2'), wherein each one of said joints (1, 2, 1', 2', 3, 4, 5, 6) comprises:

a plurality of holes (14, 24) extending within the joint in a longitudinal direction (X) corresponding to a direction of insertion in said structural elements (P1, P2, P2'), and one or more holes (15) defined in one or more transverse directions, said holes (14, 24, 15) in the longitudinal and one or more transverse directions being adapted to receive screws that fix at least two of said joints (1, 2, 1', 2', 3, 4, 5, 6) to each other, wherein, at a joint between two of more of said structural elements, each structural element has one of said joints inserted within an end, and the screws affix the two or more of said structural elements to one another by engaging at least some of said holes in the longitudinal and one or more transverse directions, and wherein, after joining, the two or more structural elements abut against each other.

2. The structure (S) according to claim 1, wherein each one of said joints (1, 2, 1', 2', 3, 4, 5, 6) has two opposite end sides that include a front end side (11, 21) and a rear end side (12, 22), which are orthogonal to said longitudinal direction (X), and lateral sides (13, 23) configured to be substantially opposed to lateral sides (P13, P23) of the structural element (P1, P2, P2') in which said joint (1, 2, 1', 2', 3, 4, 5, 6) is fitted.

3. The structure (S) according to claim 2, wherein said system comprises a first joint or terminal joint (2, 6) comprising of said plurality of longitudinal holes (24), and wherein said first joint or terminal joint (2, 6) is adapted to be longitudinally fitted in the end (P21) of one of said structural elements (P2, P2'), in such a way that said front end side (21) of the first joint or terminal joint (2, 6) is essentially aligned with said end (P21) of the one of said structural elements (P2, P2').

4. The structure (S) according to claim 3, wherein said system of joints comprises one or more corner joints or internal joints (1, 5) comprising the one or more transverse holes (15) made in its lateral sides (13) and oriented to be orthogonal to the respective lateral side (13), wherein said internal joints (1) are suited to be fitted in said structural elements (P1) in any position, in proximity to the end (P11, P12) of the structural element (P1) or in any position (Pli) along the structural element (P), and wherein through holes (P14) are made in lateral sides (P13) of said structural element (P1) at a level of said transverse holes (15) of said internal fitted joint (1) for insertion of the screws (V).

5. The structure (S) according to claim 4, wherein a union of at least one of said internal joints (1), fitted in a first structural element (P1), with at least one of said terminal joints (2), fitted in the end (P21) of a second structural element (P2), takes place with said front end side (21) of said terminal joint (2) parallel to one of said lateral sides (13) of said internal joint (1), with the lateral side (P13) of said first structural element (P1) interposed therebetween, and through one or more of the screws (V) inserted in said longitudinal holes (24) of said terminal joint (2) and in said holes (P14) in the lateral side (P13) of the first structural element (P1) and screwed into said transverse holes (15) of said internal joint (1).

6. The structure (S) according to claim 4, wherein said internal joint (1) and a respective structural element (P1) fitted therein are adapted to be constrained to at most a same number of terminal joints (2), and corresponding structural elements (P2), as a number of lateral sides (13) of said internal joint (1), and wherein the same internal joint (1) it is adapted to receive connections in all of the transverse directions that are orthogonal to said lateral sides (13).

7. The structure (S) according to claim 3, wherein said transverse holes (15) are threaded internally and are long enough to ensure a permanent engagement of a correspondingly threaded screw.

8. The structure (S) according to claim 3, wherein a length of said longitudinal holes (14, 24) is equal to an entirety or part of a length of said joint.

9. The structure (S) according to claim 3, wherein said structure comprises one or more of the joints (3, 4) provided with one or more longitudinal grooves (31, 41, 42), in such a way that one or more of said joints have a cross section with at least one recess at a level of a corner, said one or more of said joints being adapted to be fitted in a correspondingly shaped structural element providing a perimeter or intermediate horizontal structural element and positioned at a level of edges of a floor.

10. The structure (S) according to claim 4, wherein said system comprises one or more terminal joints (6) with rectangular cross section, configured to be fitted in the structural elements having a corresponding cross section and coupled with corresponding internal joints (5) having an increased length (L1) equal to a long side of said terminal joints (6) with rectangular cross section.

11. The structure (S) according to claim 1, wherein one or more joints comprise one or more second longitudinal holes (72) in a central portion for insertion of elements and accessories.

12. The structure (S) according to claim 1, wherein said joints are made of a metallic material.

13. The structure (S) according to claim 1, wherein said joints are made of a non-metallic material.

* * * * *